United States Patent

Billeter et al.

[11] 3,927,369
[45] Dec. 16, 1975

[54] MICROWAVE FREQUENCY SENSOR UTILIZING A SINGLE RESONANT CAVITY TO PROVIDE SIMULTANEOUS MEASUREMENTS OF A PLURALITY OF PHYSICAL PROPERTIES

[75] Inventors: Thomas R. Billeter; Lee D. Philipp, both of Richland, Wash.

[73] Assignee: Westinghouse Electric Corporation, Pittsburgh, Pa.

[22] Filed: Jan. 31, 1973

[21] Appl. No.: 328,220

[52] U.S. Cl............................................ 324/58.5 C
[51] Int. Cl............................................ G01r 27/04
[58] Field of Search ...................... 324/58.5 C, 58 C

[56] References Cited
UNITED STATES PATENTS

| | | | |
|---|---|---|---|
| 2,520,602 | 8/1950 | Linder............................ | 324/58.5 C |
| 2,520,604 | 8/1950 | Linder........................ | 324/58.5 C X |
| 2,580,968 | 1/1952 | Sproull........................ | 324/58.5 C X |
| 3,514,703 | 5/1970 | Soga............................... | 324/58.5 C |

FOREIGN PATENTS OR APPLICATIONS

| | | | |
|---|---|---|---|
| 1,173,438 | 12/1969 | United Kingdom............ | 324/58.5 C |
| 1,197,699 | 7/1970 | United Kingdom............ | 324/58.5 C |

Primary Examiner—Stanley T. Krawczewicz
Attorney, Agent, or Firm—D. C. Abeles

[57] ABSTRACT

A multiple property measurement microwave sensor and associated instrumentation are described employing a single hollow cavity resonating at a plurality of frequency modes to provide simultaneous measurements of a corresponding plurality of parameters. The sensor is specifically suited to operate in caustic, hostile environments, such as are found in fast breeder reactors, but is applicable to other environments as well. Pressure variations are sensed by the movement or deflection of a portion of one wall of the resonant microwave cavity. The movement or deflection results in a variation in the effective cavity length along the axis of an incident energy wave employed to excite multiple resonant frequency modes and thus, in a variation of the resonant frequency of the pressure dependent modes. Temperature changes cause the cavity size, and thus, the resonant frequency of the temperature dependent modes to vary. Both physical properties can be continuously monitored simultaneously as each relates to a distinct mode of cavity resonance.

In one embodiment, a pressure feedback loop is employed to minimize deflection and plastic strain on the movable wall portion. Alternate modes of operation employ degenerate resonant frequency modes to resonate the cavity, thus minimizing the bandwidth of the incident energy necessary to excite the cavity to resonance and the bandwidth of the detection instrumentation employed to monitor reflected energy.

16 Claims, 10 Drawing Figures

U.S. Patent  Dec. 16, 1975  Sheet 1 of 2  3,927,369
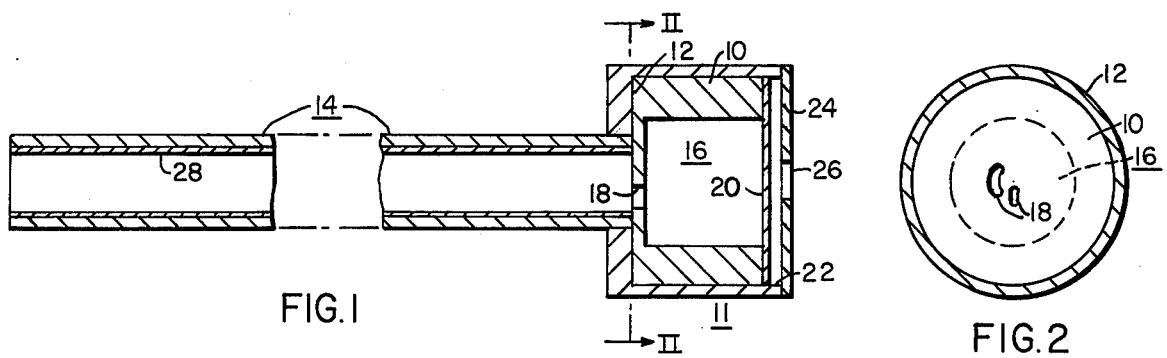
FIG. 1
FIG. 2
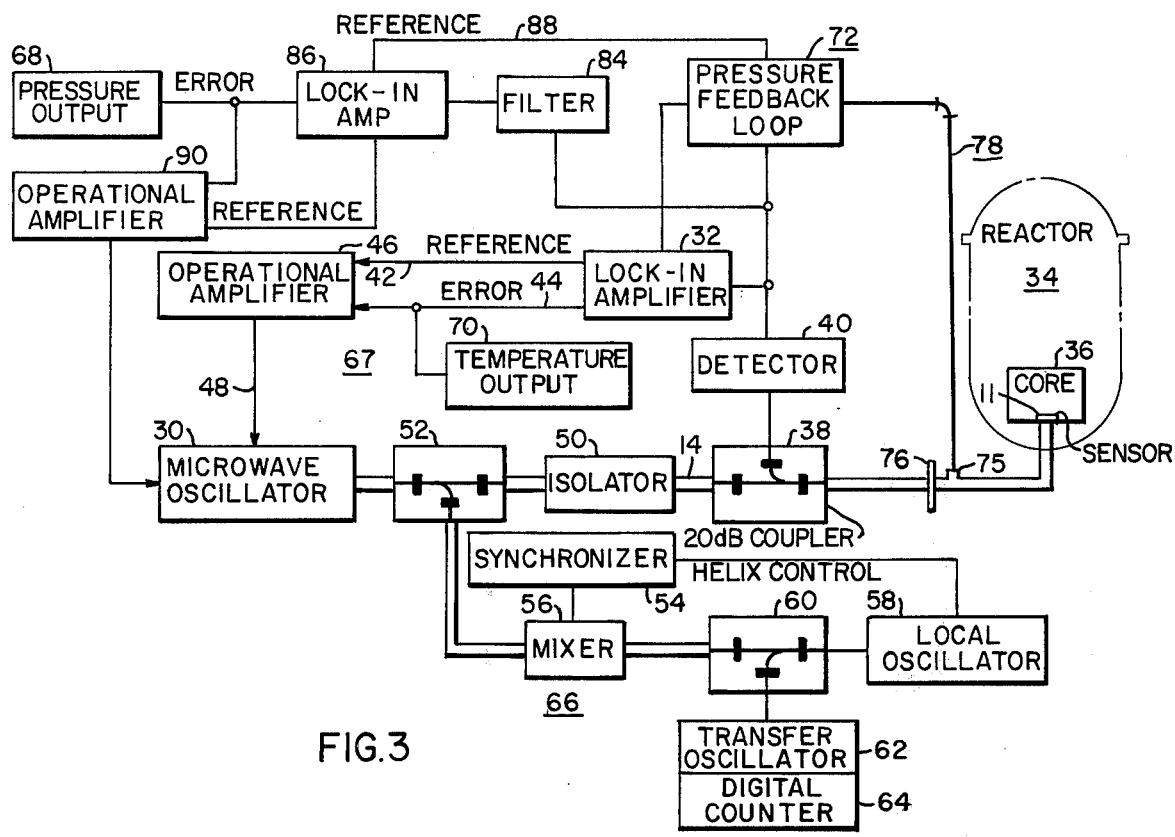
FIG. 3
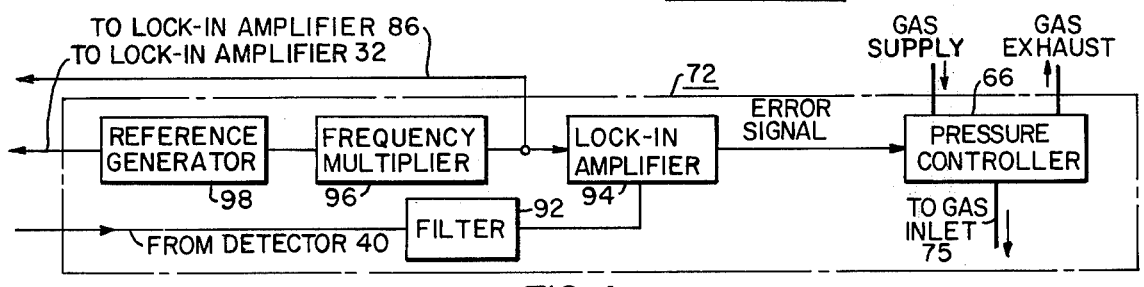
FIG. 4
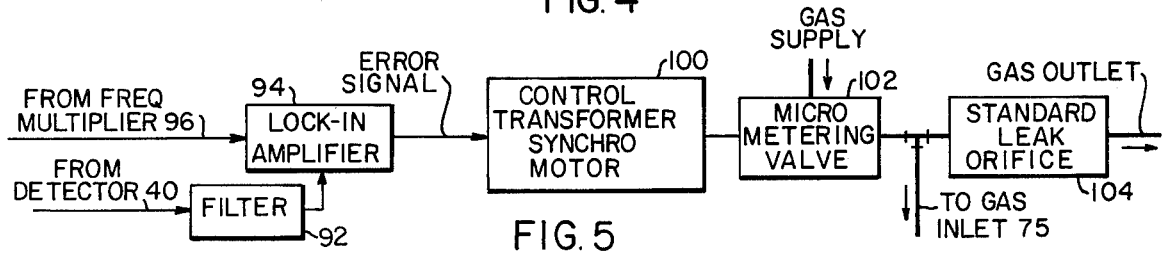
FIG. 5

MICROWAVE FREQUENCY SENSOR UTILIZING A SINGLE RESONANT CAVITY TO PROVIDE SIMULTANEOUS MEASUREMENTS OF A PLURALITY OF PHYSICAL PROPERTIES

BACKGROUND OF THE INVENTION

The invention described herein was made in the course of, or under, a contract with the United States Atomic Energy Commission, and pertains generally to microwave sensors and more particularly to such sensors that employ a single resonant microwave cavity to simultaneously monitor a plurality of parameters.

Measurements of physical properties within very severe environments impose stringent requirements upon sensors. Liquid metal cooled, fast breeder nuclear reactors can present a combination of operating conditions detrimental to the reliable performance of many property sensors. These conditions include temperatures ranging from 900° to 1,400°F, pressure differentials from 20 to 200 psi, and radiation fields of gamma and neutron flux densities of $10^6$ to $10^9$ R/Hr and $10^{13}$ to $10^{16}$ nv, respectively. Additionally, the sensor and its connecting transmission line should be relatively immune to long term degradation during immersion in the liquid sodium coolant.

Temperature is often measured using metal alloy thermocouples which perform reliably up to about 1,800°C. Partially due to the inherent radiation affects of the nuclear environment, the use of such sensors must be closely controlled, otherwise the generated signal will not accurately reflect the actual temperature of the volume being measured. Furthermore, a satisfactory solution of problems directly associated with the thermocouples will not completely alleviate the detrimental affects encountered, as one must also consider problems associated with the lead-in cable insulation, which can deteriorate in the high radiation flux environment.

Similarly, pressure sensing methods used within the core or vessel of a nuclear reactor exhibit limitations which adversely affect their usefulness and reliability. Furthermore, each physical property measured requires at least one separate sensor and associated external instrumentation.

While microwave resonance techniques appear to be specifically suitable for application in hostile environments, the measuring apparatus presently available in the art employing microwave technology (such as are evidenced by the following U.S. Pat. Nos.: 3,458,808, 3,400,330, 3,559,043, 3,581,190, 2,494,570 and 3,437,922) do not appear to provide the capability of enabling continuous, simultaneous measurements utilizing a single sensor cavity. These characteristics are specifically secured within environs having a limited volume available to accommodate monitoring instrumentation.

SUMMARY OF THE INVENTION

Briefly, this invention contemplates a single unit sensor capable of simultaneously and continually monitoring and yielding signals respectively proportional to a multiple of physical parameters. The single sensor operates at microwave frequencies and as it can be constructed entirely of metal components it is specifically applicable to measurements in extremely severe environments, such as are found within fast breeder reactors.

A high frequency electromagnetic source transmitting an energy output having a frequency varying within a given range of frequencies is employed to excite a microwave cavity to resonate at least a plurality of resonant frequency modes dependent upon and corresponding to the type and number of parameters to be measured. The cavity is provided with a movable wall section responsive to one of the physical properties to be measured to alter the dimensions of the cavity in a manner to change the effective length along the axis of the incident exciting energy. The reflected energy from the cavity is monitored and decoded to provide outputs respectively representative of the properties being measured.

In one embodiment the cavity is designed to resonate under ambient conditions at degenerate resonant modes in order to minimize the bandwidth of the incident energy necessary to excite resonance in the cavity and the detection instrumentation employed to monitor reflected energy. Alternate embodiments minimize the pressure differentials across the movable wall section of the cavity in order to avoid plastic strain or rupture of the member.

Thus, simultaneous measurements are achieved from a single sensor exhibiting the desired ruggedness, versatility, and accuracy required for application within hostile environments.

BRIEF DESCRIPTION OF THE DRAWINGS

For a better understanding of the invention, reference may be had to the preferred embodiment, exemplary of the invention, shown in the accompanying drawings, in which:

FIG. 1 is a sectional view of the dual property sensor and waveguide assembly contemplated by this invention, cut along the axis of the cylindrical waveguide and cavity resonator;

FIG. 2 is a cross sectional view taken along the lines II—II of FIG. 1;

FIG. 3 is a schematic diagram of an exemplary sensor system contemplated by this invention shown in a fast breeder reactor environment;

FIG. 4 is a schematic diagram illustrating an accessory pressure feedback loop which can be employed with this invention;

FIG. 5 is a schematic diagram of a modification to the pressure feedback loop illustrated in FIG. 4;

DESCRIPTION OF THE PREFERRED EMBODIMENT

Figure 6A:
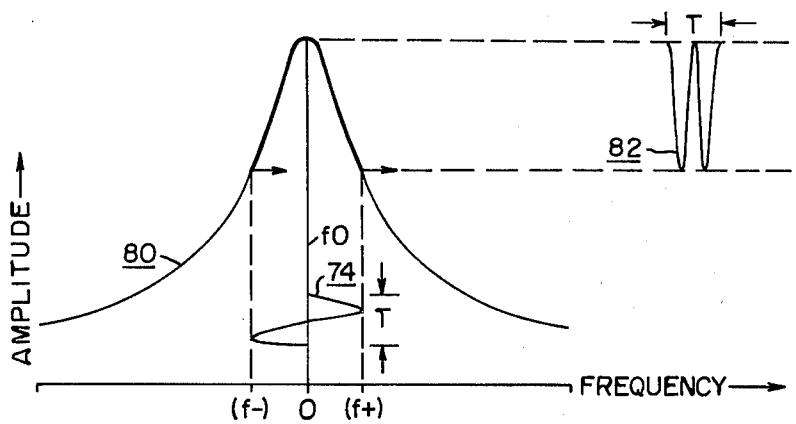
FIGS. 6A, 6B and 6C are graphical illustrations of the sensor cavity's response to temperature changes.

In accordance with this invention a multiple property measurement, microwave sensor is disclosed employing a single hollow cavity resonating at a plurality of frequency modes to provide simultaneous measurements of a plurality of parameters associated with the physical properties of the environment being measured. The single sensor, operating at microwave frequencies, and constructed entirely of metal, is peculiarly capable of making such measurements in severe caustic environments such as are encountered within a liquid-metal-cooled fast breeder reactor; though, it should be understood that the sensor of this invention is generally applicable to other environments as well.

A better understanding of the capability and operation of the sensor of this invention can be had from the following theoretical explanation. An all metal hollow structure of particular dimensions will resonate simultaneously in multiple, discrete modes if the structure has internal dimensions comparable to the wavelength of the driving energy (source). In particular, a hollow cylindrical unit can be designed to resonate at microwave frequencies. The exact resonant frequency associated with each mode of resonance is determined by the relationship:

$$f_o = \sqrt{\frac{\left(\frac{l}{L}\right)^2 \pm \left(\frac{U'mn}{\pi a}\right)^2}{4c^2}} \quad ; \qquad (A)$$

for $L$ and $a$, respectively, the length and radius (inside dimensions) of the cylinder, $c$, the velocity of light in the material interior to the cavity, and $U'$ $m, n$, the argument for which the derivative of the mth order of the nth kind Bessel function is zero. This holds for transverse magnetic (TM) modes, $U$ $m, n$ (the non-derivative value) is substituted for $U'm, n$. For each selected discrete combination of integer values of $l, m$ and $n$ (commonly known as the Eigen-value) the cylinder can resonate at a distinct frequency. A similar analysis applies to other geometries and this invention should not be considered as being limited to cylindrical structures. The preferred embodiment, to follow, is limited to such structures, however merely to establish a basis of understanding of the substance of this invention. For such structures there are specific values of $(2a/L)^2$ for which the cylinder resonates in two distinct (degenerate) modes for the same exciting frequency.

Exciting the resonator in specific desired modes can be accomplished by techniques of coupling the resonator to the attached signal transmission line (waveguide). Suppression of unwanted resonant modes can be achieved by inclusion within the cavity of attenuative cuts, slots, or positioned posts. Significantly, the cavity can resonate at the same frequency, but different modes simultaneously. Also, the resonant frequency of one mode can depend upon the cavity length, whereas the other does not. Consequently with the proper choice of two resonant modes, each of which has some frequency dependence upon the measured physical parameters, pressure and temperature can be determined independently utilzing a single sensor.

While degenerate modes have specific advantages as will be pointed out hereinafter, simultaneous measurements can also be achieved by exciting the resonant cavity to resonate at two different frequencies at the same time, each frequency being specifically dependent upon at least one of the parameters measured. Inasmuch as three spatial parameters generally define the electric and magnetic fields existing within the cavity ($l$ defining the number of half period variations of the electric and magnetic fields along the axis of the incident exciting energy m defining the number of half period variations radially outward of the center of the cavity, and n defining the number of circumferential variations), a third resonant frequency can be employed, simultaneously resonating within the cavity with the other two, to provide a measurement of a third physical parameter at the same time as the other two. The only limitation is the specific dependence that has to be maintained between the parameters to be measured and the variations of the individual frequencies of resonance with respect thereto.

A prime requisite for the microwave sensor contemplated by this invention concerns the dependence of the selected mode resonant frequency upon the measured physical parameters. Linear dimensions, S, of the resonant cavity (specifically, length and diameter) vary with temperature according to the relationship:

$$S = S_o (1 + \alpha\ T = \beta\ T^2 + \gamma\ T^3 \ldots\ ); \qquad (B)$$

for $S_o$ the dimension at the initial temperature, $T$, the temperature change from the initial value, and $\alpha, \beta, \gamma$, empirically determined values of the coefficients of thermal expansion. For the operating range of temperatures expected in a fast breeder reactor, and the metal sensor contemplated by this invention, the dependence of the sensor dimensions upon temperature is anticipated to remain fairly linear. Consequently, the sensor will exhibit a nearly linear response with temperature variations. Sensor pressure sensitivity results by designing at least a portion of one wall of the cavity as a movable member (such as a piston, bellows or diaphragm as will be described), movable in response to applied pressure to change at least one geometrical dimension of the cavity. For example, for a cylindrical cavity having an end wall diaphragm, deflectable along the axis of the incident wave employed to excite the cavity, the diaphragm deflection will cause a variation in the effective length of the cavity which can be expressed by the relationship:

$$\Delta L_{max.} = \frac{a^4 \Delta P}{6Et^3} ; \qquad (C)$$

where $E$ is the metal modulus of elasticity, t, the diaphragm thickness, and the change of cylinder length for the change of pressure, $\Delta P$, is maximum at the center of the diaphragm.

An example of a single cavity, dual property, measurement sensor commensurate with this invention is illustrated in FIG. 1. The sensor illustrated basically comprises an oxygen free, high conductivity, copper inner cylinder 10, pressed into a 304 L stainless steel outer jacket 12 exemplarily measuring 0.8 inch diameter by 0.5 inch length. An outer jacket is employed to increase the structural ruggedness of the sensor in order to withstand the severe operating environment for which the senor is to be adapted. Most high conductivity metals suitable for transmitting microwave energies cannot withstand severe operating conditions without such additional structural support. Therefore, the high conductivity metal is supported within the jacket and can be affixed thereto by any suitable means such as by brazing. Only a thin continuous coating or deposit is required for this purpose, so that any other method consistent with the desired characteristics can'be employed to achieve the cavity lining. Two slots 18 are indicated at one end of the cylinder 10, as shown in the cross sectional view illustrated in FIG. 2, for coupling microwave electromagentic fields from the connecting waveguide 14 to the cavity interior 16. While two such slots 18 are indicated, one for exciting each mode, it should be understood that in practice one slot, properly designed, can serve both purposes. A 0.005 inch thick by 0.58 inch diameter stainless steel edge supported pressure diaphragm 20 forms one wall of the cylinder 10 and can be affixed by brazing or other suitable means to a recess 22 in the copper inner cylinder 10. A stainless steel cover 24, having a central fluid inlet 26 assures even distribution of pressure on the diaphragm and is not required in reactor applications, where the entire sensor is normally immersed within the reactor coolant environment. The sensor cavity 16 connects via a circular waveguide 14, which is similarly constructed out of stainless steel with a high conductivity inner cladding 28, to external instruments shown schematically in FIG. 3.

Generally, the external equipment illustrated in FIG. 3 includes a microwave signal source 30 and two auxiliary instrument loops 66 and 67; one (67) to maintain the oscillator output centered around the frequency of cavity resonance; and the other (66) to measure the source output frequency. Microwave signal power from the oscillator 30 propagates through the rectangular or circular waveguide 14, and at the resonant frequency of the cavity 11 the input signal is absorbed. At frequencies off resonance, the signal is reflected. The amplitude of the reflected signal is detected, amplified and returned to the oscillator as a control input. The lock-in amplifier 32 provides small amplitude, low deviation frequency modulation of the source oscillator. If the source center frequency coincides with the central frequency of the sensor resonance response, zero error signal results; however, for a small frequency difference, an error signal from the lock-in amplifier forces the source oscillator to remain in frequency coincidence with the sensor resonant frequency. Indications of the deviation of the sensor resonant frequency from an initial value can be related to the amplitude of the error signal, or alternatively obtained from the digital frequency readout shown as an auxiliary part of the circuit of FIG. 3.

In operation, the microwave source 30, which can be any one of a multitude of well known devices such as a backward wave oscillator or a klystron, is modulated at a frequency over a narrow band which includes the monitored mode or modes of sensor resonance. A phase-sensitive detection method, as summarized above, yields an error signal from the lock-in amplifier 32 whenever the source oscillator output frequency does not coincide with the frequency of resonance of the mode response. Thus, a microwave oscillator 30 excites the sensor to resonate at the design prescribed frequency modes. For this example, two degenerate frequency modes will be considered inasmuch as they provide the advantage of enabling a narrower bandwidth sweep for the microwave oscillator and, additionally, a selection of detection components with narrower bandwidth response characteristics.

As a specific example, a single cylindrical resonator 11, operating degenerately in the $TE_{201}$ and $TM_{002}$ modes (for $(2a/L)_2$ approximately equal to 1.6 at a microwave frequency of 36,369 MHz) can be employed to monitor both the temperature and pressure applied to the sensor. The subscripts associated with the given notation representative of the transverse electric and magnetic modes refer to the $l$ mn Eigenvalues previously referred to. If one mode has a temperature induced resonant frequency dependent upon one, or at most, two spatial variables of the sensor ($l$ mn), then the remaining spatial variable (associated with the second degenerate mode) can be made sensitive to variations in pressure. Mode degeneracy persists over variations of temperature (at constant applied pressure) because the value of $(2a/L)^2$ remains approximately constant. Thus, since temperature can be determined from the resonant frequency of the $TM_{002}$ mode, and pressure from the resonant frequency of the $TE_{201}$ mode, the $TE_{201}$ resonant frequency response of the sensor is made dependent upon applied pressure by the design of a flexible sensor end wall effective to vary the internal length $(L)$ of the sensor in response to a pressure change. The amplitude of maximum deflection from a static value for an edge supported end wall is given by the equation B previously noted. Considerable flexibility in the design for a desired sensor detection sensitivity (the change of resonant frequency per unit pressure change) exists by the selection of the end wall metal and its dimensions. Simultaneously, the temperature of the sensor can be determined from the $TM_{002}$ mode response. Fortunately, this mode resonates at a frequency independent of the cylinder length (although this restriction of mode selection is not required for the successful application of this invention). Therefore, variations in pressure applied to the sensor do not alter the $TM_{002}$ resonant frequency. As previously stated, variations within the cavity geometry, due to temperature, occur linearly and therefore the $TM_{002}$ resonant frequency varies proportionally. Note also that the sensor length changes in a similar manner with temperature variations. Consequently, the value of $(2a/L)^2$ remains constant and therefore degeneracy between the $TM_{002}$ and $TE_{201}$ modes continues regardless of temperature variations. Hence, the single microwave sensor has the capability of monitoring, simultaneously, variations and static values of pressure, due to the frequency dependence of the $TE_{201}$ mode, and variations and static values of temperature, due to the frequency dependence of the $TM_{002}$ mode.

As further confirmation of the validity of the disclosed measurement contemplated by this invention, assume that for a temperature $T_0$, and pressure difference across the diaphragm $\Delta P$, equal to zero, the degenerate $TE_{201}$ and $TM_{002}$ modes are resonantly excited at a frequency $f_0$ equal to 36,369 MHz. If the temperature of the cavity (sensor) changes to another value $(T_1)$, the resonant frequency of the cavity will change by the same amount, for each mode, thereby maintaining coincidence at a value $f_1$. If, however, the pressure difference also changes to a different value $\Delta P_1$, not equal to zero, the pressure sensing mode ($TE_{201}$) will tend to resonate at $f_2$ (where $f_2$ does not equal $f_1$). The variations in the resonant frequencies of the respective modes can be monitored by sampling the energy reflected from the sensor with the detection instrumentation illustrated in FIG. 3.

Thus, the sensor in this exemplary embodiment is designed to resonate in two degenerate frequency modes, under ambient conditions, at one frequency $f_0$. Initially, as previously described, the microwave oscillator 30 illustrated in FIG. 3 forms a source for the electromagnetic energy which is ccommunicated to the sensor 11 via the cylindrical waveguide 14. The microwave oscillator is tuned, by an internal control (error) signal and an input reference signal 42 to initially sweep around the central resonant frequency $f_0$, to excite the sensor to resonate at its two degenerate frequency modes. The resonant frequency of the degenerate modes will vary according to the temperature and pressure of the sensor environment. Accordingly, the frequency of the reflected energy provided back through the waveguide will provide an indication of this variation in resonant frequency.

As is known in the art, almost complete absorption of the incident energy at the resonant frequency or frequencies of the sensor can be effected by proper design of the cavity. Therefore, as the microwave oscillator transmits energy of varying frequencies departing from the resonant frequency or frequencies of the sensor, less and less of the energy incident on the sensor will be absorbed. The reflected energy can be sampled, for example, by the 20 DB coupler 38, which diverts a portion of the reflected energy to the detector 40. The microwave coupler and detector combination 38 and 40 is a well known piece of equipment in the art which provides an electrical signal output proportional to the energy of the sampled reflected wave. This electrical output is then communicated to the lock-in amplifier 32 which provides an error signal output 44 representative of the frequency or frequencies of resonance of the sensor upon an approximate null in the detector output occurring at a deviation from the control frequency or frequencies of resonance of the cavity. At the same time, a built-in reference signal 42 is communicated by the lock-in amplifier to the operational amplifier 46, which sums the reference and error inputs and provides a helix control voltage output 48. The helix control voltage further adjusts the microwave oscillator to scan around a center frequency corresponding to the new resonant frequency. An isolator 50 is provided within the cylindrical waveguide 14 to prevent the reflected signal from being transmitted back to the microwave oscillator and in essence functions as an electromagnetic diode. In addition, a second coupler 52, provided at the output of the microwave oscillator, diverts a portion of the transmitted energy to a sampling circuit 66 which records the frequency of the microwave oscillator on a digital counter 64. The components 56, 58, 60, and 62 translate the microwave oscillator frequency to a frequency compatible with the transfer oscillator 62, which is employed to drive the digital counter 64. Thus, the control output frequency of the microwave oscillator is repeatedly sampled and recorded on the digital counter 64.

More specifically, referring to FIG. 6 it can be observed that, under designed ambient conditions, as the microwave oscillator 30 communicates an incident energy modulated by a reference signal 74 of period $T$, varying around the initial degenerate frequency of resonance fo by a bandwidth extending from $f-$ to $f+$, the cavity's response will be as indicated by the graph illustrated by reference character 80 in FIG. 6A. The reflected energy from the cavity will actually be proportional to the mirror image of the illustrated cavity's response due to the cavity's structural configuration which is designed to absorb more and more of the incident energy as the oscillator output frequency appraoches the frequency or frequencies of resonance of the cavity. Accordingly, the output of the detector 40 will be proportional to the inverse of the waveform 80 and the lock-in amplifier will be responsive to the waveform 82. Inasmuch as the variation in the detector's output response is of a much higher frequency than the modulation frequency of the incident energy wave, twice the frequency of the modulation of the incident energy in this example, the lock-in amplifier 32, of designed narrow bandwidth, will not provide an error output response 44. The built-in control signal will therefore continue to maintain the microwave oscillator sweep centered around fo.

Figure 6B:
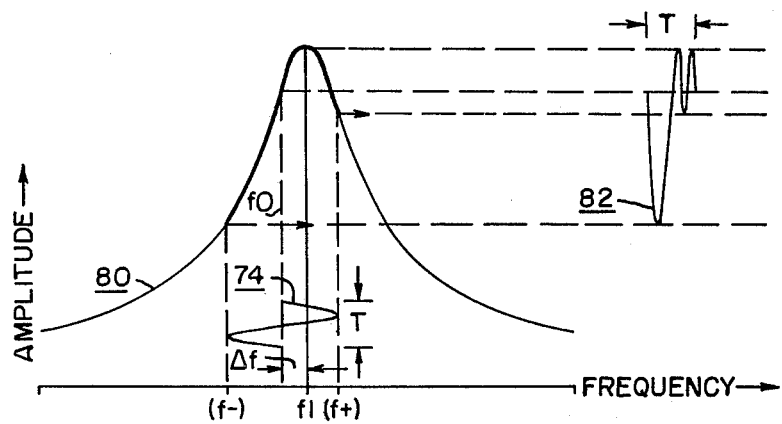

With a given monitored environmental temperature variation the resonant frequency of the cavity will shift by $\Delta f$ to a new resonant frequency $f_1$, as illustrated in FIG. 6B. However, the instantaneous oscillator sweep at the time of the temperature excursion will remain centered around $f_o$. The detector output in response to this deviation will communicate a signal having a large fundamental component at the modulation or reference frequency as depicted by waveform 82 shown in FIG. 6B. The lock-in amplifier 32 will respond to the fundamental reference frequency component of the detector output to provide a representative error signal which will be reflected in the helix control voltage to the oscillator 30. The new helix control voltage will tend to maintain the oscillator sweep centered around the new frequency of resonance of the cavity. As is known in the art a slight deviation from resonance will be encountered due to the inherent closed-loop feedback response. However this deviation is minimal and will not affect the operation of the system.

Figure 6C:
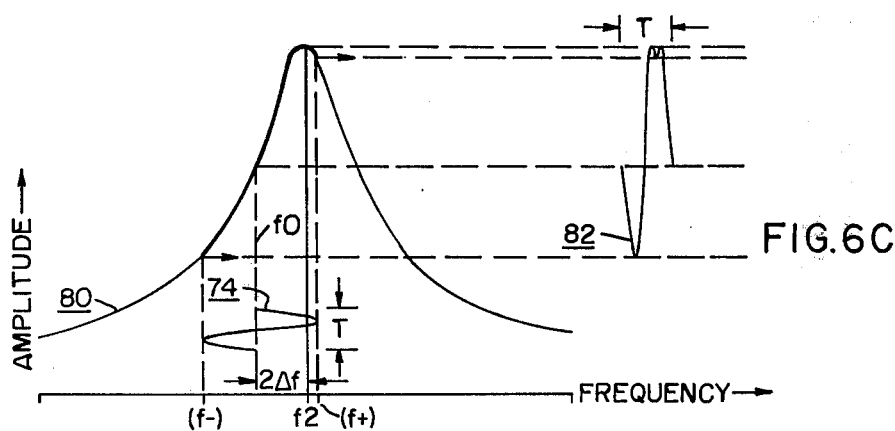

Similarly, as larger temperature excursions occur corresponding changes in the resonant frequency of the cavity will be encountered as illustrated by $2\Delta f$ and $f_2$ in FIG. 6C. As the temperature deviations become larger the detector output will exhibit a larger fundamental harmonic component. The lock-in amplifier 32 will respond by providing a proportionally larger error output which will tend to alter the center frequency of the oscillator sweep to coincide with the new frequency of resonance of the cavity. Thus, the lock-in amplifier error output 44 is representative of the net temperature and can be displayed on a suitable display 70 to give an indication of the measured temperature of the monitored environment.

In an analogous manner the pressure resonance harmonic components of the detector 40 output can be employed to give an indication of the measured pressure excursions exhibited by the monitored environment. In the example provided in this embodiment the fourth harmonic of the detector output is responsive to pressure and is isolated by the bandpass filter 84 for communication to a second lock-in amplifier 86. The various lock-in amplifiers are driven from a common reference generator located within the pressure feedback loop 72 which forms an auxiliary portion of this system. A frequency multiplier similarly located within the pressure feedback loop 72, is interposed between the reference generator and the lock-in amplifier 86, and functions to translate the frequency of the reference input to a frequency multiple compatible with the harmonic component of the detector output of interest. Where the pressure feedback loop is not employed a separate reference generator and frequency multiplier will have to be included in order to provide corresponding inputs to the lock-in amplifiers 32 and 86 (or the generator and multiplier can be supplied internally of the respective amplifiers). Accordingly, in this example, the multiplied reference generator signal translates the bandwidth of the lock-in amplfier 86 to a frequency range compatible with the fourth harmonic of the modulated detector response. The output of the amplifier 86 will then be proportional to incremental pressure excursions and can be connected to a suitable readout, such as a counter, to indicate pressure changes.

Since the TM resonant frequency is independent and the TE resonant frequency is dependent upon variations in the effective length of the sensor in response to pressure changes, the sensor's resonant behavior in respone to an applied pressure change for frequency shifts which remain within the modulation bandwidth of the incident excitation energy emanating from the microwave oscillator can be represented by a curve similar to that illustrated in FIG. 6 having two peaks, one representative of the TM resonant response and the other respresentative of the TE resonant response. The oscillator feedback loop will be responsive to shift the central frequency of oscillator scan to a frequency between the two new resonant frequencies of the sensor, providing a small error in the temperature output reading. However, the narrow bandwidth of oscillator sweep will limit the temperature error deviation to an insignificant value.

Larger pressure fluctuations which shift the TE resonant response outside the microwave oscillator modulation bandwidth will not be detected by the circuitry thus far described without a pressure feedback loop. However, a slight modification can be adapted to the helix control feedback loop to accommodate this condition. The microwave oscillator can be programmed to alternately sweep across a second band of frequencies outside the bandwidth of the original oscillator sweep, similarly employing a second error and reference derived from the lock-in amplifier 86 for close loop control of the central scan frequency. The helix control outputs from the respective operational amplifiers 48 and 90 will have to be programmed to correspond to the switched mode of oscillator sweep. Additionally the respective helix control outputs will require retentative memories (well known in the art) in order to retain their control output, while the alternate mode of scan is being employed, to assure continuity in the respective measurements. The described modification will thus increase the range of pressure excursions which can be measured by the apparatus contemplated by this invention.

For long term service it is desirable to operate the diaphragm in a non-deflected state to avoid possible creep strain affects. To accomplish this end, a gas pressure equal to the pressure exterior of the diaphragm must exist within the cavity's interior. However, addition of a gas to the interior of the cavity will effect the material dielectric constant and therefore the frequencies of response. The magnitude of this affect as compared to the affect of either pressure or temperature induced frequency changes has been experimentally determined to be small and a function of gas pressure and temperature. Therefore, this negligible affect will not be of concern.

Furthermore, pressure balance between the exterior and interior walls of the chamber will provide an additional advantage in being able to maintain degenerate resonant frequency modes with changes in both temperature and pressure and will avoid the necessity of employing the programmed oscillator sweep previously described, inasmuch as pressure is measured by small incremental variations from the normal effective length of the resonant cavity.

The metal strain on the diaphragm can thus be minimized by including a pressure feedback loop 72 to limit the pressure differential across the diaphragm. The exemplary feedback loops illustrated in FIGS. 4 and 5 employ the fourth harmonic of the detector output 40 to indicate a pressure excursion. A bandpass filter 92 reduces the detector 40 output to the fourth harmonic and communicates this pressure responsive signal to the lock-in amplifier 94. The reference generator 98 forms the reference source for each of the individual lock-in amplifiers presented in the various embodiments described herein and has its output translated by the frequency multiplier 96 to alter the bandwidth of the lock-in amplifiers 94 and 96 to accommodate the fourth harmonic of the detector output. The error signal output of the lock-in amplifier 94 is then proportional to pressure and forms the control input for the pressure controller 66. The pressure controller is a well known device in the art and will provide a gas flow or exhaust, via the pipe ductwork 78, to the interior of the sensor, tending to equalize the pressure on the interior and exterior sides of the diaphragm in response to the control signal input. The pressure window 76, provided within the cylindrical waveguide, functions to isolate the sensor in order to maintain the desired pressure. While the pressure window is opaque to gas it is designed to be transparent to the microwave oscillator signal and therefore does not affect the operation of the system as previously described. Due to the inherent operation of the pressure controller in adjusting its mechanical components, a built-in delay time is provided in establishing pressure balance, enabling the lock-in amplifiers and associated output devices to respond to the affects of the initial pressure differential. Each subsequent pressure variation is then added or subtracted in accordance with the direction of the pressure excursion to give a net pressure change. Thus, while deflection is minimized across the diaphragm of the sensor, the operation of the system is not affected.

Pressure control can similarly be achieved by the apparatus illustrated in FIG. 5. In this embodiment the error output from the lock-in amplifier 94 is employed to control a control transformer - synchromotor arrangement 100 which adjusts the volume of the gas supply input to the sensor via a micrometering valve 102. The standard leak orifice 104 maintains a fixed rate of exhaust to accommodate a command for pressure reduction within the cavity. In steady state operation the volume of gas supplied by the micrometering valve 102 is designed to equal the exhaust capacity of the orifice 104. Thus this arrangement provides a simpler less expense alternative to the pressure controller 66 illustrated in FIG. 4.

Figure 7:
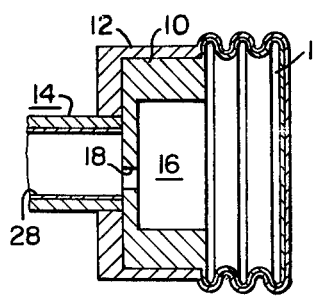
FIG. 7 is a sectional view of a modification to the sensor of FIG. 1.
Figure 8:
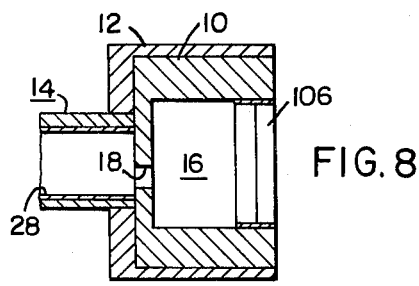
FIg. 8 is a sectional view of a second modification to the sensor of FIG. 1.

It should be understood that while the movable portion of the wall section of the resonant cavity has been described as a deflectable diaphragm for the purpose of providing a simpler understanding of the theory of operation of this invention, a piston 106, bellows 108, or other like member can be used in its place, as respectively illustrated in FIGS. 7 and 8. A total peak pressure excursion can be recorded by avoiding the use of the pressure feedback loop and employing a bellows manufactured out of a non-resilient material or a piston arrangement similar to the one identified by reference character 106. For a totally responsive pressure measurement a resilient bellows a return piston mechanism will have to be employed in the absence of a pressure feedback loop. Closed loop pressure control can avoid both these complications. Additionally, for some specific choices of modes of frequency resonance, electrical and magnetic continuity will have to be maintained between the walls of the cavity adjacent the movable member and the member itself. This is left as a specific design criteria for a particular mode of operation.

Thus, this invention contemplates a method and apparatus for providing the simultaneous measurement of several physical properties utilizing a simple, all metal sensor incorporating a single resonant microwave cavity. An obvious area of application concerns the nuclear industry where the multiple measurment sensor will reduce the number of in-core sensors required, and because of its simplicity, will improve the reliability of the measurement apparatus. The sensor and associated transmission line (waveguide) are operable without degradation in very severe environments including high levels of fast and thermal neutron flux and gamma radiations, liquid sodium coolants, high temperatures as limited by the metals employed and pressures up to at least several hundred pounds per square inch.

It should be understood that the described method and apparatus is not limited to reactor applications, or caustic environments, but can be employed in many other technology areas. Additionally, while the preferred embodiment was described employing two degenerate modes, separate resonant frequencies can be used with the obvious disadvantage that a wider bandwidth will have to be provided on the sweep of the microwave oscillator and the detection instrumentation. Furthermore, it should be understood that the geometries described for the particular components illustrated were merely provided for explanatory purpose and alternate configurations can be established for any given prescribed design criteria.

We claim as our invention:

1. Apparatus for providing the simultaneous measurement of a plurality of physical properties of a given environment including:
    a high frequency electromagnetic energy source capable of transmitting energy having a frequency varying within a given range of frequencies;
    cavity resonator means comprising a single hollow member having a wall section responsive to one of the physical properties to be measured to move in a manner to change the effective dimension of the hollow cavity along a prescribed axis, said resonator means being designed to have a plurality of coexisting resonant frequency modes, within the given range of frequencies, corresponding to the plurality of physical properties being measured, said resonant frequency modes being respectively dependent upon a unique combination or permutation and collectively dependent on all of the properties being measured;
    means for communicating said energy from said source to said cavity to excite said cavity to resonate at said plurality of resonant frequency modes, said communication means further transmitting any reflected energy resulting thereby; and
    detection means responsive to said reflected energy to provide respective outputs each representative of one of the plurality of properties measured.

2. The apparatus of claim 1 wherein the movable wall section of the cavity resonator comprises a piston and a portion of the remaining interior of the cavity is designed to form the walls of a piston cylinder to accommodate movement of the piston in response to a variation in the one of the physical properties to be measured.

3. The apparatus of claim 1 wherein the movable wall section comprises a deflectable member.

4. The apparatus of claim 3 wherein the deflectable member comprises a bellows.

5. The apparatus of claim 3 wherein the deflectable member comprises a diaphragm.

6. The apparatus of claim 1 wherein said cavity is adapted to be isolated from and disposed within the environment measured.

7. The apparatus of claim 1 wherein said resonant frequency modes are degenerate modes having a coincident resonant frequency at the ambient state of the environment measured.

8. The apparatus of claim 7 wherein the physical properties to be measured are temperature and pressure and the degenerate modes employed are $TE_{201}$ and $TM_{002}$.

9. The apparatus of claim 1 wherein said communication means comprises:
    a waveguide communicably coupling the energy transmitted from said source to said cavity;
    means coupled to said source and responsive thereto to provide an output representative of the frequency of the energy transmitted thereby; and
    means responsive to the energy reflected by said cavity to provide an output representative of the resonant frequencies thereof.

10. The apparatus of claim 1 wherein said detection means comprises:
    means responsive to the resonant frequencies of said cavity to provide an output representative of one of the physical properties being measured; and
    means for providing a representation of a comparison between the resonant frequencies of said cavity with the resonant frequencies of said source and responsive to provide an output representative of a second of the physical properties being measured..

11. The apparatus of claim 1 wherein said cavity forms a pressure tight chamber and including a pressure feedback loop responsive to the environmental pressure external to said wall section to balance the pressure within said chamber to the pressure external of said wall section, said pressure feedback loop having a slower response time than said detection means.

12. A method for providing the simultaneouos measurement of a plurality of physical properties of a given environment comprising the steps of:
    exciting a single resonant hollow cavity with a high frequency electromagnetic energy wave varying in frequencies within a given range of frequencies to resonate the cavity at plurality of coexisting frequency modes corresponding to the plurality of physical properties being measured, the cavity having a wall section responsive to one of the physical properties to be measured to move in a manner to change the effective dimension of the hollow cavity along a prescribed axis of the incident exciting energy wave, the resonant frequency modes being respectively dependent upon a unique combination or permutation and collectively dependent on all of the properties being measured;
    exposing an exterior portion of the cavity including the movable wall section to the environment measured;
    monitoring the reflected energy emanating from said cavity to provide an output representative of the resonant frequencies of the cavity; and
    detecting variations in the resonant frequencies of the cavity to provide respective outputs each representative of one of the plurality of properties measured.

13. The method of claim 12 including the steps of disposing the cavity within and isolating the cavity from the environment being measured.

14. The method of claim 12 whwerein said exciting step excites the cavity to resonate at a plurality of degenerate frequency modes.

15. The method of claim 12 wherein said detecting step comprises the steps of monitoring any relative and absolute shift in the resonant frequency modes of the reflected energy from the cavity to provide respective outputs representative of the properties being measured.

16. The method of claim 12 including the step of adjusting the pressure of the cavity to balance the pressure external to the wall section thereof subsequent to a predesigned time delay after an external pressure change.

* * * * *